No. 762,813. PATENTED JUNE 14, 1904.
W. FETZER.
GRAIN DRILL.
APPLICATION FILED JULY 8, 1903.
NO MODEL. 3 SHEETS—SHEET 1.
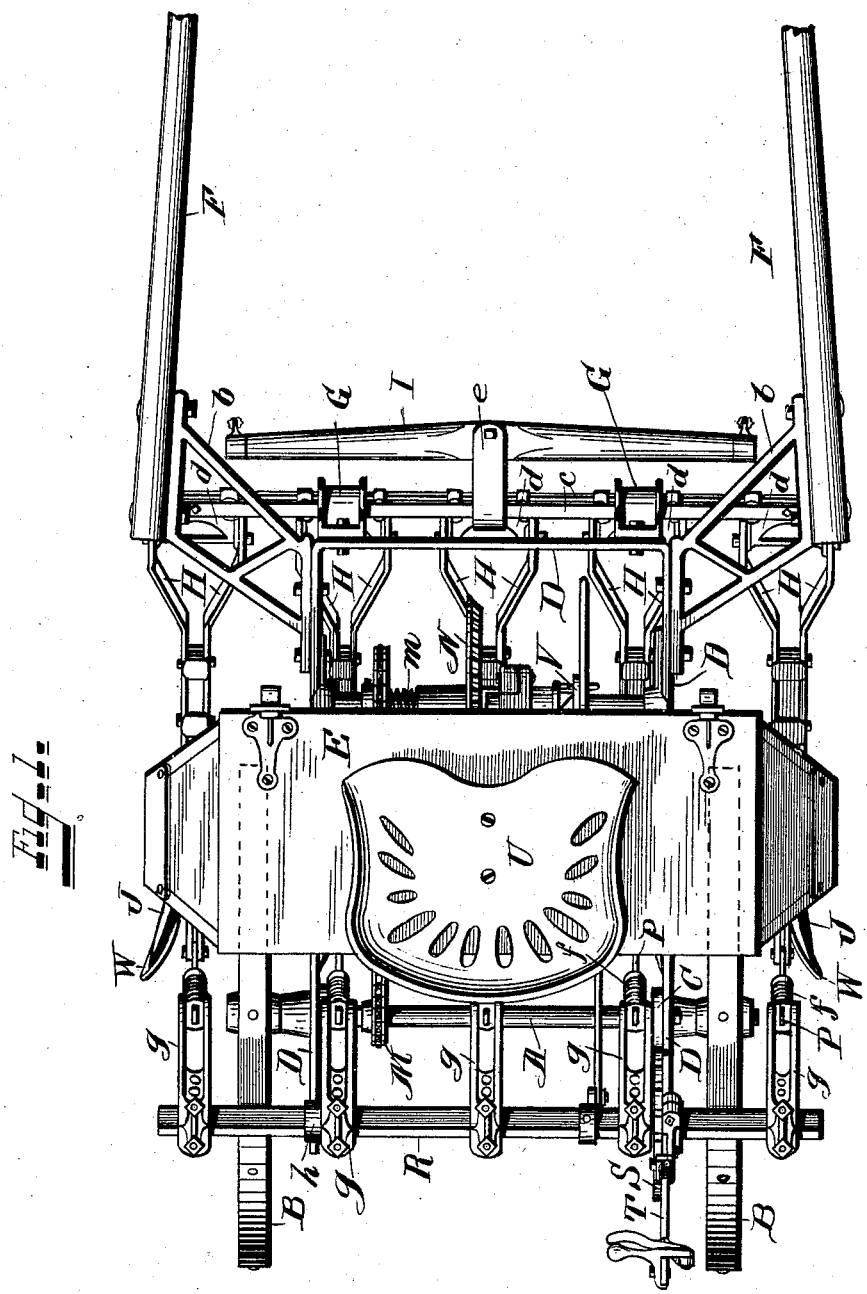

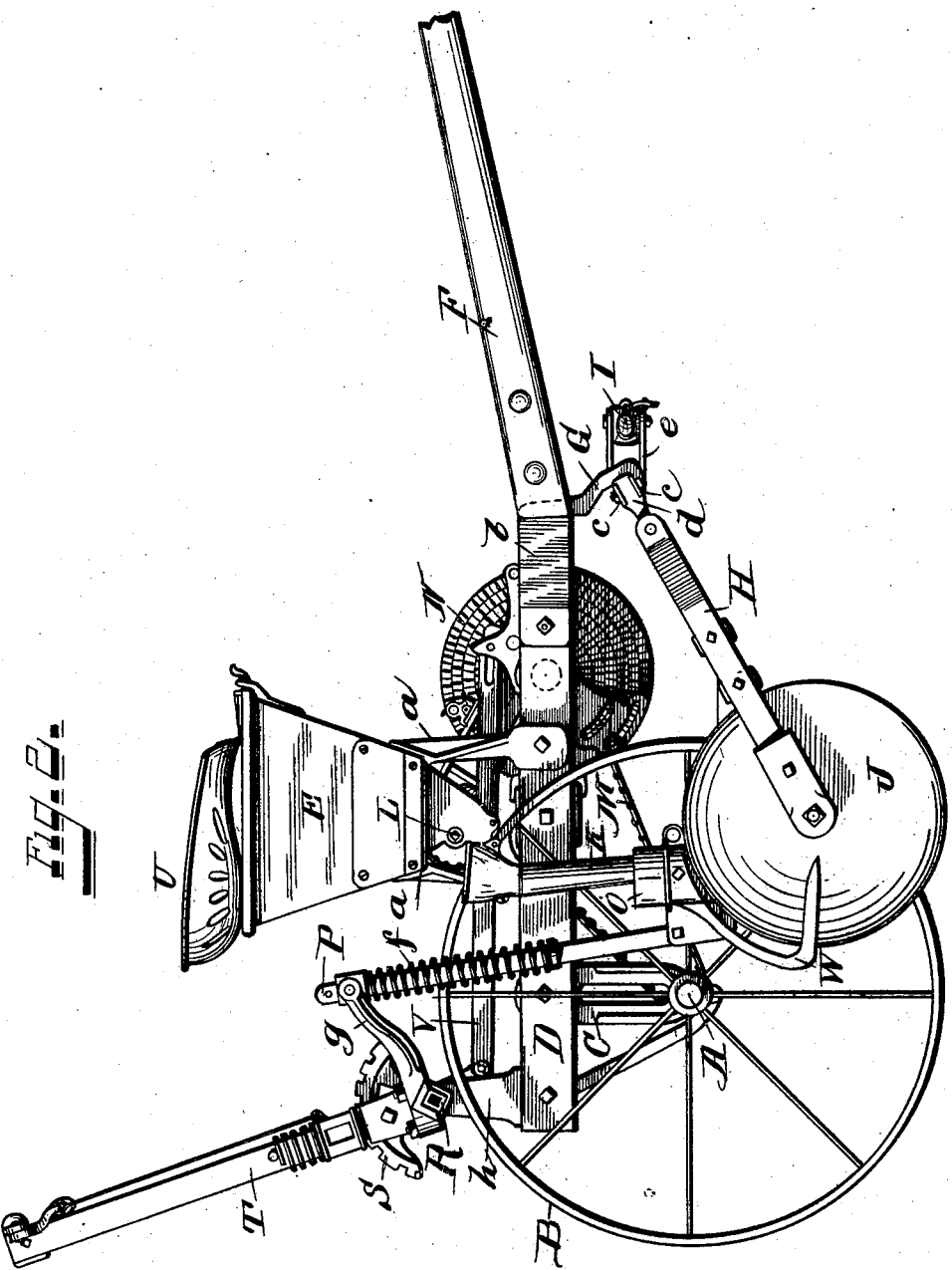

No. 762,813. PATENTED JUNE 14, 1904.
W. FETZER.
GRAIN DRILL.
APPLICATION FILED JULY 8, 1903.
NO MODEL. 3 SHEETS—SHEET 3.
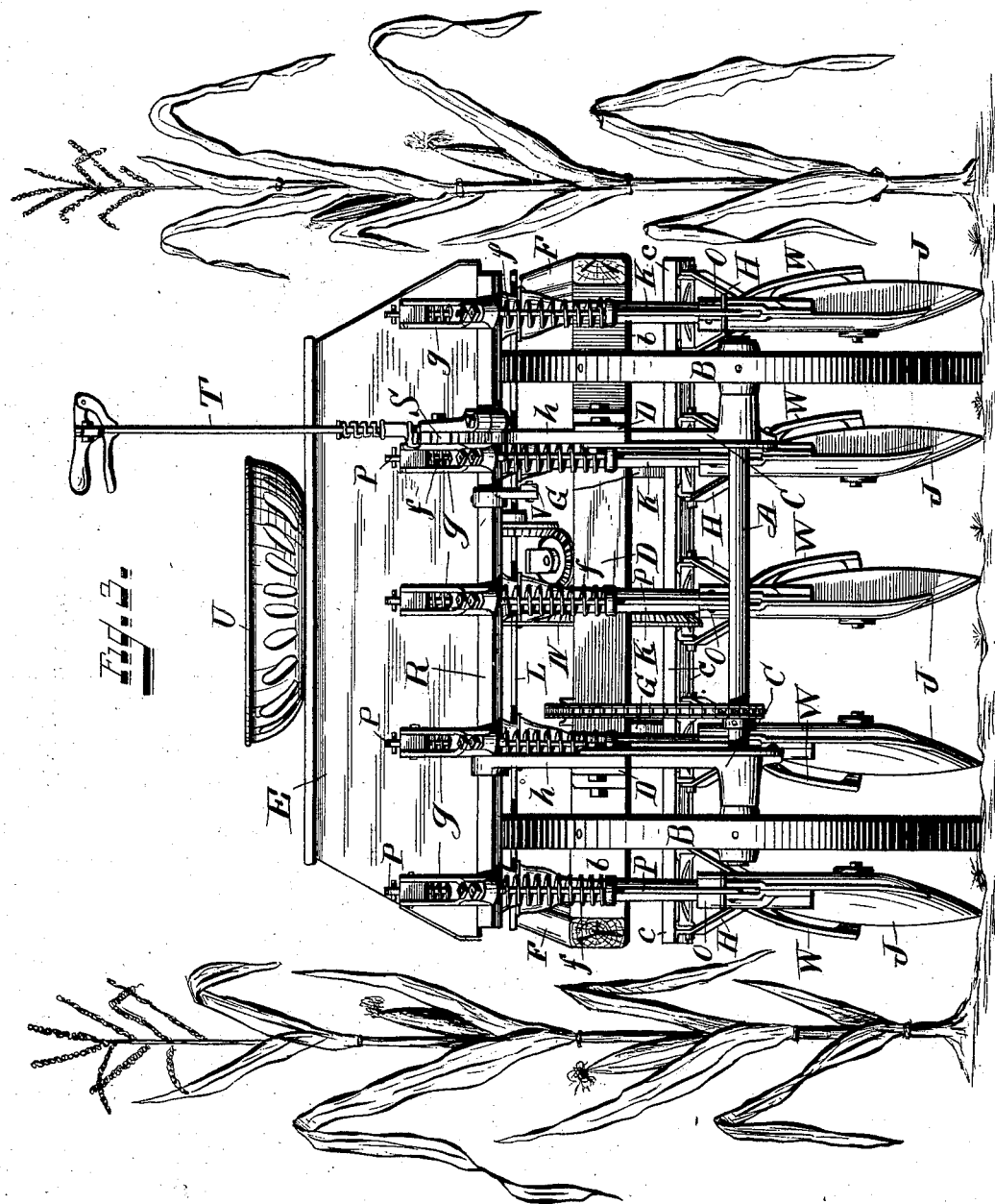
Witnesses.
Edward Peck
Inventor.
William Fetzer
by Chas. M. Peck
his Attorney.

No. 762,813. Patented June 14, 1904.

UNITED STATES PATENT OFFICE.

WILLIAM FETZER, OF MIDDLETOWN, OHIO.

GRAIN-DRILL.

SPECIFICATION forming part of Letters Patent No. 762,813, dated June 14, 1904.

Application filed July 8, 1903. Serial No. 164,674. (No model.)

*To all whom it may concern:*

Be it known that I, WILLIAM FETZER, a citizen of the United States, residing at Middletown, in the county of Butler and State of Ohio, have invented certain new and useful Improvements in Grain-Drills, of which the following is a full, clear, and exact description, reference being had to the accompanying drawings, forming part of this specification.

In the economy of agriculture in a great many sections of our country it has for a great many years past been desirable to plant small grains, especially winter wheat and rye, between the growing rows of corn, which rows are on an average of from thirty-eight to forty-six inches apart, so that the ground may be fully utilized, and when the corn crop is harvested there will still remain a full crop covering the entire ground except in the rows where the corn stood and which crop is usually wintered over and harvested at another season. To do this planting of the small grains between the rows of corn, a machine known as a "five-hoe" drill has been most commonly used; but such machine has numerous disadvantages, among which are that it has simply a clevis-hitch like a plow, a forward supporting wheel or wheels in front of the furrow-opening devices, which required the placing of the draft-animal much too far in front, and the machine was guided from the rear by plow-handles and the operator walked in the rear to guide the machine as best he could by said plow-handles, which has always been found burdensome work, particularly at the time it is used—during the hot summer months—between the high rows of corn, where no breeze reaches the operator. The result of this old style machine is that the operator has no perfect guiding control of it and has to manage it by bodily strength, which under the circumstances is very exhausting, and it can and does swerve from side to side, thereby injuring the roots of the growing corn and decreasing the yield of the corn crop to a greater or less extent. My improved machine is designed to remedy all of these difficulties. It is designed to bring the operator directly in rear of the draft-animal, so that he can have perfect control of it, and to carry the operator on the machine, where his weight will be useful in forcing the furrow-openers into the ground, and it contemplates as a departure in this class of machines a machine upon which the operator can ride instead of having to walk behind it and handle it by main force after the manner of a plow and in which the operator riding on the machine has complete control of it in the management of all its parts both for raising and lowering the furrow-openers from the ground and regulating their depth of penetration, the proper guiding of the draft-animal to insure the true running of the machine and the prevention of injury to the roots of the growing corn, and also the provision of a framework for the seeding mechanism and furrow-opening mechanism, which framework is provided with supporting or carrying wheels in rear of the furrow-opening mechanism and with a driving connection from either or both of said wheels to the seed-distributing mechanism and with shafts in front for the draft-animal and a seat on the frame or the seedbox thereof for the operator. By this arrangement great compactness of structure is obtained. The supporting and carrying wheels are brought inside of the outer furrow-openers. The operator is placed close to and in rear of the draft-animal and bears almost the same controlling relation to it that the driver of a racing-sulky has over his animal, so that the machine can be perfectly guided with great ease and without injury to the roots of the growing corn on either side.

Among other things, my invention contemplates the employment in a machine of this character of disks as the furrow-openers, which disks are carried on drag-bars and each of which has a spring-pressure applied thereto under the control of the operator on the machine, who can regulate the extent of the pressure, although each is independent to rise in passing obstructions and will then resume its working position. While this is the preferred construction of furrow-opening mechanism, it is to be understood that my invention is not to be limited to a furrow-opener of the disk type, but that any other preferred form of furrow-opener may be employed as well.

Having thus given a general outline of the purposes and objects of my invention, I will now proceed to describe it in more detail with reference to the accompanying drawings and will set out my invention specifically in the claims.

In the accompanying drawings, Figure 1, Sheet 1, is a plan view of a machine embodying my invention, the fore part of the shafts being broken away. Fig. 2, Sheet 2, is a side elevation of Fig. 1. Fig. 3, Sheet 3, is a rear elevation of the machine.

The same letters of reference are used to indicate identical parts in all the figures.

I will now describe a practical machine embodying my invention in its form best known to me at present.

A is the main carrying-axle of the machine, supported on two wheels B, either or both of which may be made fast to the axle or may have ratchet-and-pawl connection therewith after the manner of hay-rakes or other agricultural implements.

Supported upon the axle A by means of bracket-arms C, Fig. 2, is the frame D, which is preferably a U-shaped metal bar set on edge, and to this frame are secured, by means of bracket-arms $a$ or in any other suitable manner, the seed-hopper E and at the forward end of the frame by means of truss-brackets $b$, Fig. 1, the thills or shafts F.

Secured to and pendent from the forward member of the frame D are two brackets G, one at each end, to which are secured a pair of parallel metal bars $c$, between which are clamped draw-bar heads $d$, to which the forward ends of the drag-bars H are suitably pivoted and to which bars $c$ the connecting-strap $e$ of the swingletree I is also connected. The drag-bars H carry at their rear ends in the usual or any suitable manner furrow-opening disks J, which are pivoted thereto and whose pivotal axes are in advance of the axis of the carrying-wheels B.

The grain from the hopper E is conveyed, through suitable feed-wheels or distributers in the bottom of the hopper, into spouts K after a manner well-known in hoe-drill, shoe-drill, and disk-drill construction and thence is deposited, by means of suitable shields or other guides, into the furrows made by the disks, and the seed-distributing wheels are all mounted on a shaft L, driven by suitable gearing from the shaft A, in this instance by a sprocket-chain M, connected with a shaft or spindle $m$, carrying a speed-regulating disk $n$ well known in grain-drill construction and which is adjustably geared in the usual or any suitable manner to the shaft L.

The shields or boots O of each of the disks J have upwardly-projecting arms P pivoted thereto and whose upper ends are surrounded by coiled springs $f$, whose upper ends bear against arms $g$, projecting from a rock-shaft R in brackets $h$ upon the rear end of the frame D. The rock-shaft R is provided with a hand lock-lever T, adapted to engage a segment-rack S upon one of the brackets $h$ and by means of which lever spring-pressure can be put upon the drag-bars to force the disks into the ground to the required depth or to lift them entirely out of the ground, while at the same time each disk when in operating position and the lever is locked can have independent play to rise and pass an obstruction. The hand lock-lever T is within convenient access of the driver, who sits upon a seat U, in this instance supported upon the hopper or seedbox E, but which may be supported upon the frame in any other suitable position or convenient manner, and for the more perfect manipulation of the machine the lower end of the hand lock-lever is connected by a link or pivoted bar V with any suitable throw-out mechanism, which when the disks are raised disconnects the seeding mechanism from the axle A and which when the disks are lowered restores the engagement of said mechanism.

W represents any suitable scrapers carried by the boots O and adapted to engage the concave sides of the disks.

All of the foregoing details of mechanism are merely for illustrating the manner of utilizing my invention and in the best way that occurs to me at present; but it is to be understood that my invention is to be interpreted in the broadest sense that the language of my claims imply.

By the above construction I produce a drill for planting between the standing rows of corn which is exceedingly compact in its structure; in which the driver and operator rides on the machine and has the most absolute control in guiding the draft-animal to prevent injury to the roots of the corn; in which the weight of the operator is added to the machine, thus doing away with the necessity of weight-boxes heretofore used; in which the furrow-openers are yieldingly secured to the frame, so as to act independently and not tilt the whole frame, as in former constructions of machines of this class; in which the depth of penetration of the furrow-openers can be regulated at will; in which there is no tendency whatever of the furrow-openers to clog up with trash, and in which the entire machine is within direct and positive control of the operator and is calculated to do its work in the most perfect manner possible.

Having thus fully described my invention, I claim—

1. In a riding grain-drill, carrying-wheels, a supporting-frame, a draw-bar extending laterally beyond the line of said wheels, drag-arms connected therewith, said arms terminating relatively between said wheels, and, laterally, beyond the same, disks on said drag-arms, means for adjusting said disks vertically, independently-operable means for permitting independent vertical play of said disks, and a seat above said frame located between said wheel-axis and said draw-bar.

2. In a riding grain-drill, carrying-wheels, a supporting-frame, the major portion of which is forward of the axis of said wheels, a draw-bar extending laterally beyond the line of said wheels, drag-arms connected therewith, said arms terminating relatively between said wheels, and, laterally, beyond the same, disks on said drag-arms, means for adjusting said disks vertically, independently-operable means for permitting independent vertical play of said disks, and a seat above said frame located between said wheel-axis and said draw-bar.

3. In a disk grain-drill, a rigid supporting-frame, shafts connected therewith, a draw-bar connected with said frame, drag-bars pivotally connected with said draw-bar, a swingletree also connected therewith, means for regulating the thrust of said disks in series, and independent means for permitting separable vertical movement of said disks.

4. In a riding, disk, grain-drill, a rigid supporting-frame, shafts connected therewith, supporting-wheels, a draw-bar connected with said frame, a swingletree and drag-bars connected with said draw-bar, disks carried by said drag-bars between the wheels, and, laterally, beyond the same, a single adjusting means common to all of the disks, and independent spring connections adapted to permit separate play thereof.

5. In a riding, disk, grain-drill, carrying-wheels, a supporting-frame carried thereby, comprising a substantially U-shaped metallic member, a seed-hopper supported thereon, a draw-bar connected with said frame, a swingletree and drag-bars connected with said draw-bar, disks connected with said drag-bars, means for adjusting said disks in series, and means for permitting independent vertical movement thereof.

6. In a disk grain-drill, a rigid supporting-frame, shafts connected therewith, a draw-bar extending transversely across said frame at its forward end position, a swingletree connected with said draw-bar, drag-bars pivotally connected with said draw-bars, disks thereon, means for regulating the normal elevation of said disks, in series, and separate means for permitting independent vertical movement of said disks.

7. In a disk grain-drill, carrying-wheels, a frame mounted above the same, shafts connected with said frame, a seat carried on said frame between the plane of the wheel-axis and the said shafts, drag-bars connected with said frame and terminating in advance of the axis of said carrying-wheels, disks thereon operable between said wheels, and laterally beyond the same, and means, supported above the rear portion of said frame, for adjusting the said disks vertically, substantially as described.

8. In a disk grain-drill, carrying-wheels, a supporting-frame, a draw-bar suspended below the plane of said frame, draft appliances connected with said draw-bar so that draft is applied first to the draw-bar and from thence to the frame drag-arms also connected with said draw-bar, and disks on said drag-arms, independent of said frame.

9. In a disk grain-drill, carrying-wheels, a supporting-frame, the major portion of which extends forwardly of the axis of said wheels, a seat relatively between the axis of the wheels and the plane of draft connection, brackets connected with said frame, a draw-bar supported by said brackets, draft appliances connected with said bar, pivoted drag-arms connected with said draw-bar, disks on said drag-arms and means for adjusting said disks.

10. A riding grain-drill of the character described comprising in combination, a frame, shafts therefor, a draft appliance supported below the shafts, drag-arms connected therewith, cutting-disks on said arms, supporting-wheels and a shaft therefor, in the rear of said disks and a seat between said shaft and the point of connection of said drag-arms with the draft appliance.

11. In a riding grain-drill of the character described, the combination of a frame of a size and shape adapted to permit its passage between rows of corn, disk furrow-openers independently carried thereby and free to have individual play, means for supplying grain to the furrows opened by said disk, carrying-wheels supporting said frame, and a draft appliance adapted to afford a guiding means for the drill.

WILLIAM FETZER.

Witnesses:
LAWRENCE WOLVERTON,
E. PAULIN.